(12) United States Patent
Murata

(10) Patent No.: US 8,786,231 B2
(45) Date of Patent: *Jul. 22, 2014

(54) SINGLE-PHASE BRUSHLESS MOTOR DRIVE CIRCUIT

(75) Inventor: Tsutomu Murata, Mizuho (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/523,488

(22) Filed: Jun. 14, 2012

(65) Prior Publication Data

US 2013/0020974 A1  Jan. 24, 2013

(30) Foreign Application Priority Data

Jun. 14, 2011 (JP) ................................. 2011-132552

(51) Int. Cl.
*H02P 6/00* (2006.01)

(52) U.S. Cl.
USPC .................................................... 318/400.35

(58) Field of Classification Search
CPC ........... H02P 6/182; H02P 6/085; H02P 6/12; H02P 6/142; H02P 6/08; H02P 2209/07; H02P 6/18; H02P 6/205

See application file for complete search history.

(56) References Cited

U.S. PATENT DOCUMENTS

| 7,531,976 | B2 * | 5/2009 | Fukamizu et al. | ....... 318/400.34 |
| 8,035,325 | B2 | 10/2011 | Takeuchi et al. | |
| 2002/0030462 | A1 * | 3/2002 | Matsushiro et al. | .......... 318/727 |
| 2007/0092232 | A1 | 4/2007 | Fujii | |
| 2007/0194731 | A1 * | 8/2007 | Fukamizu et al. | ............ 318/254 |
| 2008/0218108 | A1 * | 9/2008 | Niikura | ..................... 318/400.17 |
| 2009/0121663 | A1 * | 5/2009 | Sejimo | ...................... 318/400.04 |
| 2010/0060217 | A1 * | 3/2010 | Ikeda et al. | .............. 318/400.11 |
| 2010/0117572 | A1 * | 5/2010 | Harada et al. | ............. 318/400.11 |
| 2010/0237812 | A1 | 9/2010 | Seki et al. | |
| 2011/0234133 | A1 * | 9/2011 | Hano et al. | ............... 318/400.21 |

FOREIGN PATENT DOCUMENTS

JP      2008312440 A      12/2008

OTHER PUBLICATIONS

Office Action Issued by the United States Patent and Trademark Office on Nov. 26, 2013, for U.S. Appl. No. 13/495,632.

Notice of Allowance issued by the United States Patent and Trademark Office on Nov. 26, 2013 for U.S. Appl. No. 13/523,450.

\* cited by examiner

*Primary Examiner* — Shawki S Ismail
*Assistant Examiner* — Zoheb Imtiaz
(74) *Attorney, Agent, or Firm* — Rennie William Dover

(57) ABSTRACT

A driving circuit for a single-phase brushless motor includes: a driving-signal-generating circuit to generate a driving signal for supplying first and second driving currents to a driving coil of the single-phase brushless motor in an alternate manner with a de-energized period therebetween; an output circuit to supply the first or the second driving current to the driving coil in response to the driving signal; and a zero-cross detecting circuit to detect a zero cross of an induced voltage, generated across the driving coil, during the de-energized period, wherein the driving-signal-generating circuit determines a length of a subsequent energized period, based on a driving cycle from a start of an energized period to a time when the zero-cross detecting circuit detects the zero cross, and the zero-cross-detecting circuit starts detection of the zero-cross after a predetermined time period has elapsed from a start of the de-energized period.

8 Claims, 12 Drawing Sheets

SINGLE-PHASE BRUSHLESS MOTOR DRIVE CIRCUIT

CROSS-REFERENCE TO RELATED APPLICATION

This application claims the benefit of priority to Japanese Patent Application No. 2011-132552, filed Jun. 14, 2011, of which full contents are incorporated herein by reference.

BACKGROUND OF THE INVENTION

1. Field of the Invention

The present invention relates to a driving circuit for a single-phase brushless motor.

2. Description of the Related Art

A brushless motor among DC motors has advantages such as its long life since it does not use any brush or commutator. By employing a single-phase brushless motor disclosed in Japanese Laid-Open Patent Publication No. 2008-312440, for example, only one position detecting device such as a Hall element is sufficient, a single phase is also sufficient in the driving circuit, and thus cost and size, etc., can be reduced.

Whereas, in a common single-phase brushless motor, a stop position exists which is referred to as "dead (locked) point" at which a rotor (rotator) thereof does not rotate even when a driving current starts to be supplied to a driving coil thereof. Thus, the single-phase brushless motor in Japanese Laid-Open Patent Publication No. 2008-312440 takes countermeasures to prevent the dead point by stopping at a position where the center of permanent magnets thereof and the center of the driving coil are deviated from each other. Further, a driving control circuit is also disclosed therein that applies a voltage generating a current in the direction opposite to that of an induced voltage (counter electromotive voltage) generated across the driving coil, thereby realizing improvement in efficiency, reduction in vibration and noise, etc.

As such, taking the countermeasures against the dead point and using the techniques to reduce vibration and noise as above enable the single-phase brushless motor to be used in various uses such as a fan motor.

Since the single-phase brushless motor is able to be configured to be small in size at a low cost, a suitable use may be a vibration motor used for a vibration function of a cellular telephone to let a user know arrival of a call, for example. Especially, when it is used as the vibration motor, a rectangular wave, more likely to generate vibrations, may be used as a driving signal, and thus the motor driving circuit can be reduced in a circuit scale, and a motor driving IC can be reduced in cost and size.

Further, among motor driving ICs, a motor driving IC is also known that incorporates therein a Hall element to detect a rotation position of a rotor. However, since such a Hall-element-incorporating IC needs to be mounted in the interior of the motor, the effect of the miniaturization thereof is reduced. Further, since an error arises in the precision for detecting the rotation position of the rotor due to characteristics of the Hall element itself during the manufacture of the IC, a test to apply a magnetic field is required before shipment of the motor. Thus, the effect achieved by the cost reduction is reduced.

SUMMARY OF THE INVENTION

A driving circuit for a single-phase brushless motor according to an aspect of the present invention, includes: a driving signal generating circuit configured to generate a driving signal for supplying, to a driving coil of the single-phase brushless motor, a first driving current and a second driving current opposite in direction to the first driving current, in an alternate manner with a de-energized period therebetween during which neither of the first driving current or the second driving current is supplied to the driving coil; an output circuit configured to supply the first or the second driving current to the driving coil in response to the driving signal; and a zero-cross detecting circuit configured to detect a zero cross of an induced voltage, generated across the driving coil, during the de-energized period, the driving signal generating circuit further configured to determine a length of a subsequent energized period, based on a driving cycle from a start of an energized period, during which the output circuit supplies the first or the second driving current to the driving coil, to a time when the zero-cross detecting circuit detects the zero cross, the zero-cross detecting circuit further configured to start detection of the zero cross after a predetermined time period has elapsed from a start of the de-energized period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

===Configuration of Entire Driving Circuit for Single-Phase Brushless Motor===

A configuration of an entire driving circuit for a single-phase brushless motor according to a first embodiment of the present invention will hereinafter be described with reference to FIG. 1.

Figure 1:
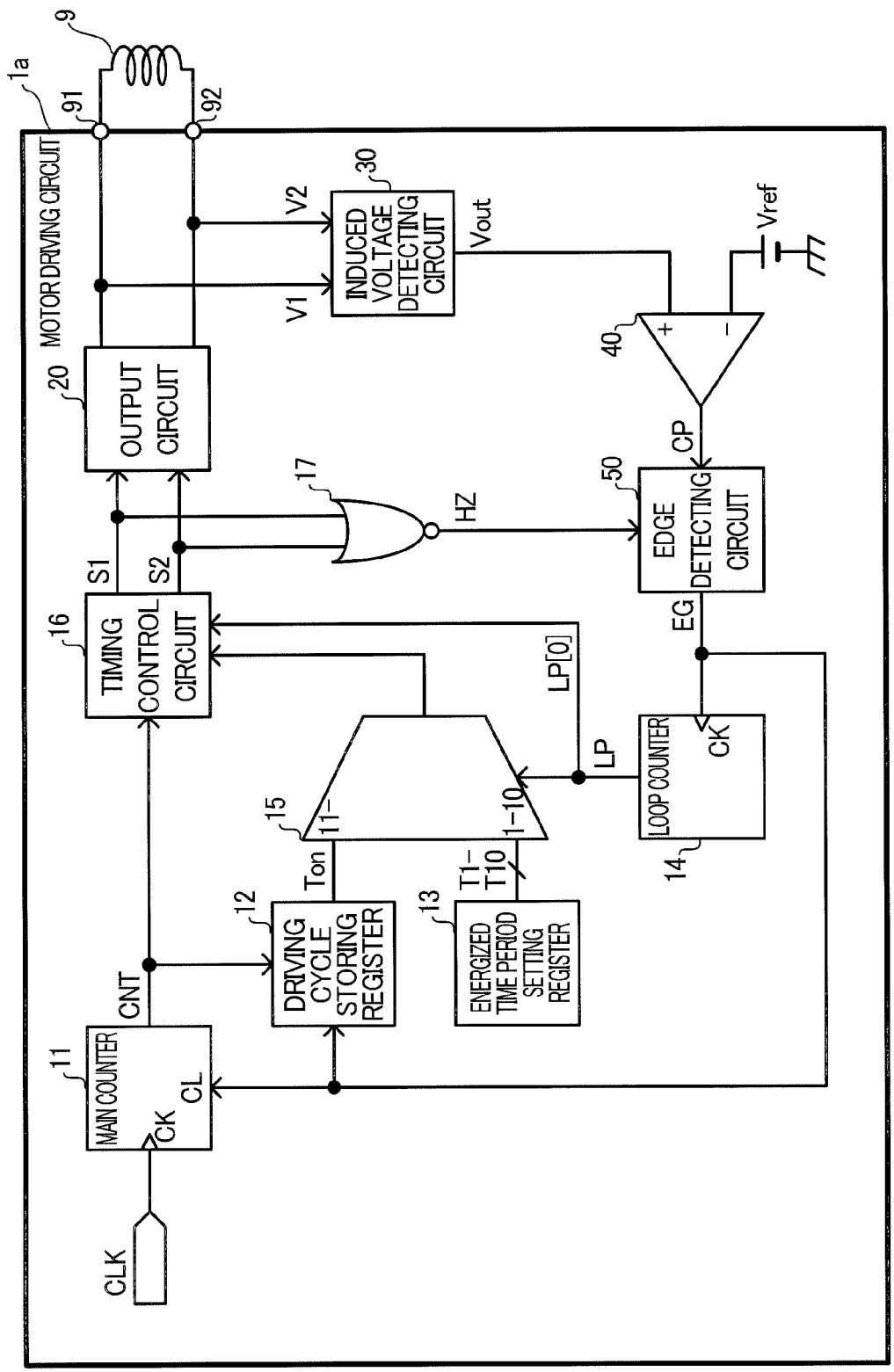
FIG. 1 is a circuit block diagram illustrating a configuration of an entire driving circuit for a single-phase brushless motor according to a first embodiment of the present invention.

A motor driving circuit 1a depicted in FIG. 1 is a circuit to drive a single-phase brushless motor including a driving coil 9, and is configured as an integrated circuit including at least output terminals 91 and 92 connected to the driving coil 9. The motor driving circuit 1a includes a main counter 11, a driving cycle storing register 12, an energized time period setting register 13, a loop counter 14, a selecting circuit 15, a timing control circuit 16, a NOR circuit (NOT-OR circuit) 17, an output circuit 20, an induced voltage detecting circuit 30, a comparator (comparator) 40, and an edge detecting circuit 50.

In an embodiment of the present invention, the main counter 11, the driving cycle storing register 12, the energized time period setting register 13, the loop counter 14, the selecting circuit 15, and the timing control circuit 16 are equivalent to a driving signal generating circuit. The induced voltage detecting circuit 30, the comparator 40, and the edge detecting circuit 50 are equivalent to a zero-cross detecting circuit.

A clock signal CLK is inputted to a CK input (clock input) of the main counter 11, and an edge detection signal EG outputted from the edge detecting circuit 50 is inputted to a CL input (clear input) thereof. A main count value CNT is outputted from the main counter 11.

The main count value CNT and the edge detection signal EG are inputted to the driving cycle storing register 12, and a normal-operation count value Ton is outputted from the driving cycle storing register 12. A start-up count values T1 to T10 set in advance for each loop count value LP outputted from the loop counter 14 are outputted from the energized period setting register 13.

The edge detection signal EG is inputted to a CK input of the loop counter 14, and the loop count value LP is outputted from the loop counter 14. The selecting circuit 15 is configured as an eleven-input, one-output multiplexer, and the loop count value LP is inputted to a select control input thereof. Further, the start-up count values T1 to T10 are respectively inputted to corresponding data inputs in the case where the loop count values LP are 1 to 10, and the normal-operation count value Ton is inputted to a corresponding data input in the case where the loop count value LP is equal to or greater than 11.

The timing control circuit 16 is inputted with the least significant bit (hereinafter, referred to as "odd-even bit LP [0]") that indicates whether the loop count value LP is an odd number or an even number, together with the main count value CNT and an output value of the selecting circuit 15. Driving signals S1 and S2 are outputted from the timing control circuit 16. Further, the driving signals S1 and S2 are inputted to the NOR circuit 17, and a high impedance signal HZ is outputted from the NOR circuit 17.

The driving signals S1 and S2 are inputted to the output circuit 20, and output nodes of the output circuit 20 are connected to the driving coil 9 through the output terminals 91 and 92. Respective voltages V1 and V2 of the output terminals 91 and 92 are inputted to the induced voltage detecting circuit 30. An output voltage Vout of the induced voltage detecting circuit 30 is applied to a non-inverting input of the comparator 40, and a reference voltage Vref is applied to an inverting input thereof. A comparison result signal CP is outputted from the comparator 40. The comparison result signal CP and the high impedance signal HZ are inputted to the edge detecting circuit 50, and the edge detection signal EG is outputted from the edge detecting circuit 50.

===Configurations of Output Circuit and Induced Voltage Detecting Circuit===

More specific configurations of the output circuit 20 and the induced voltage detecting circuit 30 will be described with reference to FIG. 2.

Figure 2:
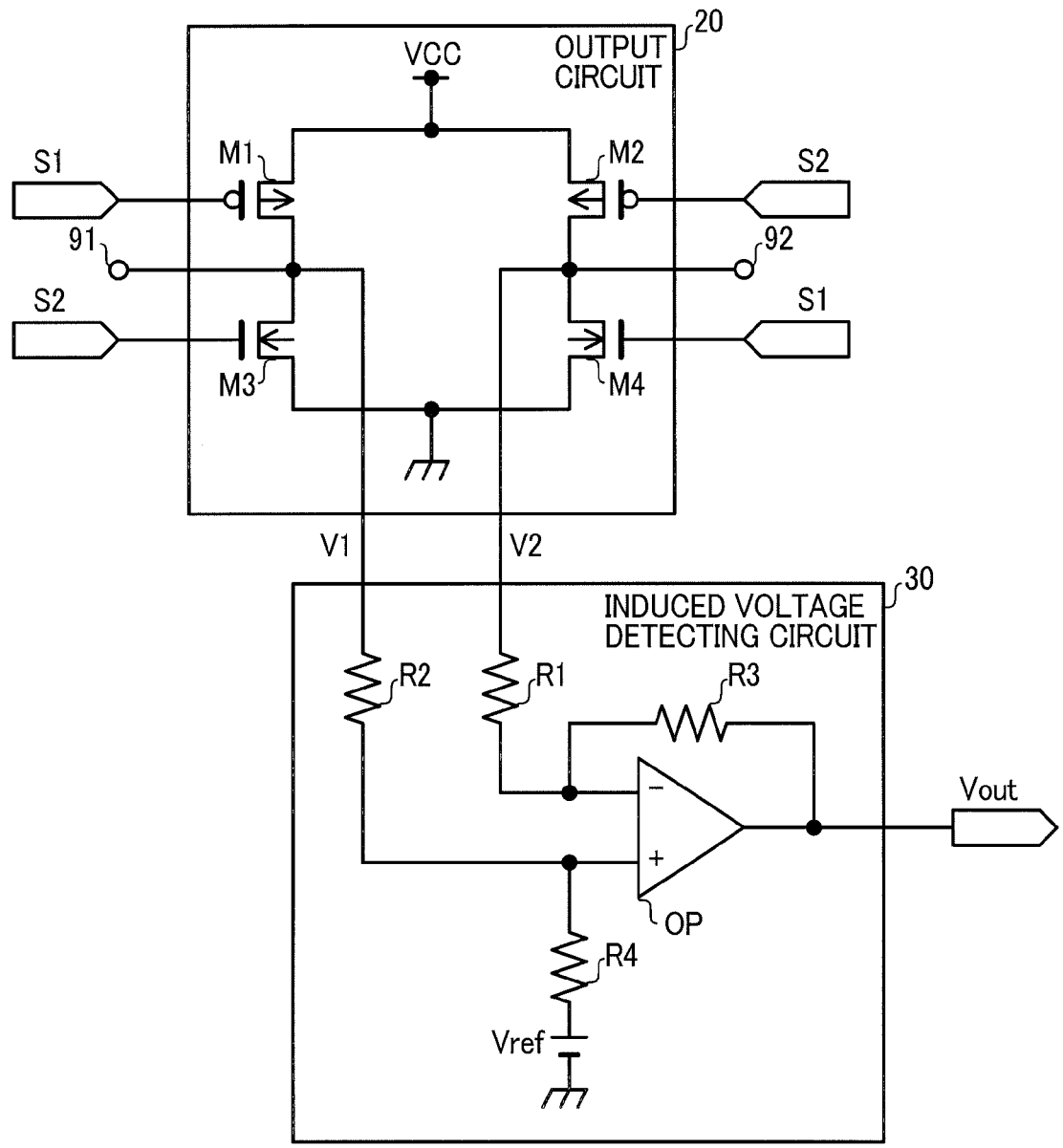
FIG. 2 is a circuit block diagram illustrating an example of specific configurations of an output circuit 20 and an induced voltage detecting circuit 30.

The output circuit 20 depicted in FIG. 2 is configured as an H-bridge circuit including output transistors M1 to M4. Hereinafter, a description will be given, as an example, of a case where the output transistors M1 and M2 are PMOS (P-channel Metal-Oxide Semiconductor) transistors and the output transistors M3 and M4 are NMOS (N-channel MOS) transistors.

The output transistor M1 is connected in series to the output transistor M3, and the output transistor M2 is connected in series to the output transistor M4. The sources of the output transistors M1 and M2 are both connected to a power source VCC, and the sources of the output transistors M3 and M4 are both connected to the ground. Further, the driving signal S1 is inputted to both of the gates of the output transistors M1 and M4, and the driving signal S2 is inputted to both of the gates of the output transistors M2 and M3. A connection point between the output transistors M1 and M3 is connected to the output terminal 91, and a connection point between the output transistors M2 and M4 is connected to the output terminal 92.

The induced voltage detecting circuit 30 depicted in FIG. 2 is configured as a differential amplifier circuit including resistors R1 to R4 and an Op Amp (operational amplifier) OP. One end of the resistor R1 is connected to the output terminal 92 and the other end thereof is connected to an inverting input of the operational amplifier OP. One end of the resistor R2 is connected to the output terminal 91 and the other end thereof is connected to a non-inverting input of the operational amplifier OP. One end of the resistor R3 is connected to the inverting input of the operational amplifier OP and the other end thereof is connected to an output of the operational amplifier OP. One end of the resistor R4 is connected to the non-inverting input of the operational amplifier OP and the other end thereof is applied with the reference voltage Vref.

===Configuration of Edge Detecting Circuit===

A more specific configuration of the edge detecting circuit 50 will be described with reference to FIG. 3.

Figure 3:
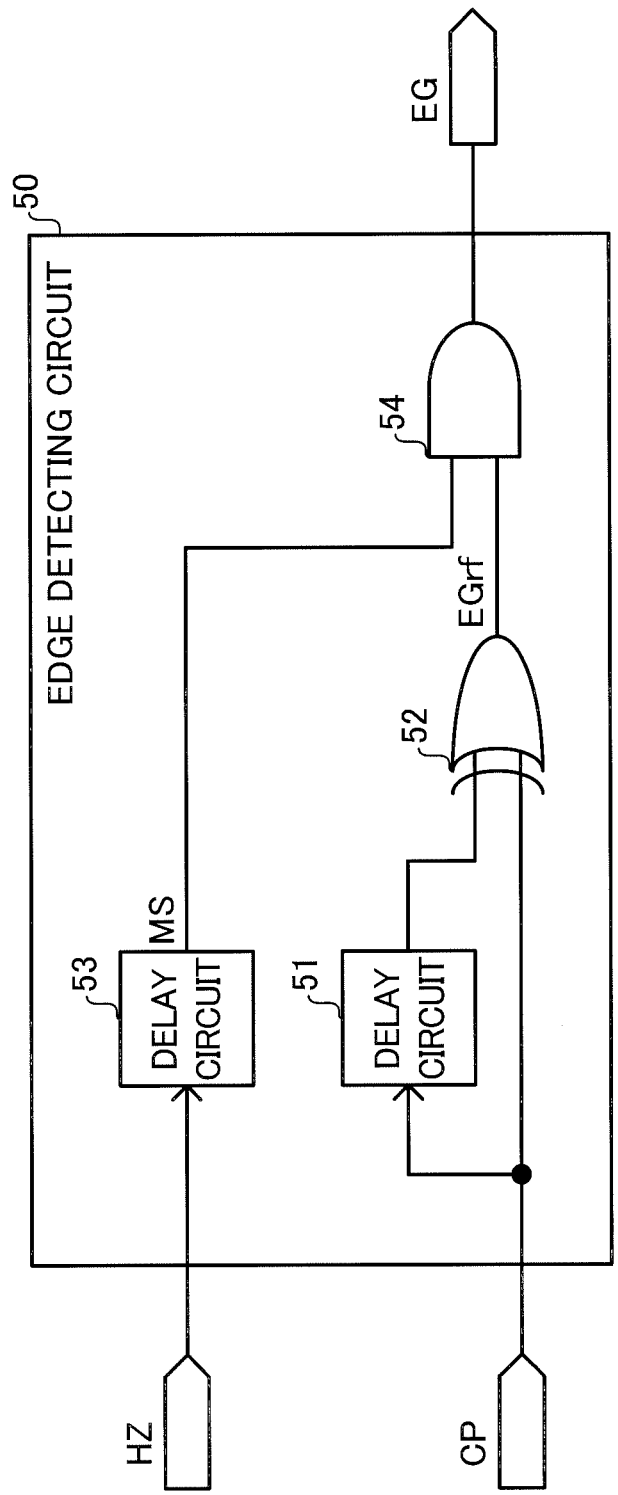
FIG. 3 is a circuit block diagram illustrating a configuration of an edge detecting circuit according to a first embodiment of the present invention.

The edge detecting circuit 50 depicted in FIG. 3 includes delay circuits 51 and 53, an XOR circuit (exclusive-OR circuit) 52, and an AND circuit (logical multiplication circuit) 54.

The comparison result signal CP is inputted to the delay circuits 51. The comparison result signal CP and an output signal of the delay circuit 51 are inputted to the XOR circuit

52. A both-edge signal EGrf is outputted from the XOR circuit 52. The high impedance signal HZ is inputted to the delay circuit 53, and a mask signal MS is outputted from the delay circuit 53. The both-edge signal EGrf and the mask signal MS are inputted to the AND circuit 54, and the edge detection signal EG is outputted from the AND circuit 54.

===Operation of Driving Circuit for Single-Phase Brushless Motor===

An operation of the driving circuit for the single-phase brushless motor according to an embodiment of the present invention will hereinafter be described.

The main counter 11 counts using the clock signal CLK, and outputs the main count value CNT that is incremented by one. The main counter 11 is reset and the main count value CNT is cleared every time the pulsed edge detection signal EG is inputted thereto. In practice, because the bit number of the main counter 11 is limited, when the main counter 11 counts to a predetermined count value (e.g., full count value), for example, the main counter 11 stops counting until it is reset.

The driving cycle storing register 12 stores therein the main count value CNT which is immediately before being cleared, as a driving cycle, every time the edge detection signal EG is inputted thereto. The driving cycle includes an "energized period" during which a driving current is supplied to the driving coil 9 and a subsequent "de-energized period" during which no driving current is supplied to the driving coil 9, as will be described later. The driving cycle storing register 12 outputs a value acquired by multiplying the main count value CNT (driving cycle) stored therein by a predetermined coefficient "a" ($0<a<1$), as the normal-operation count value Ton that indicates a length of the energized period in the subsequent driving cycle.

The loop counter 14 counts every time the edge detection signal EG is inputted thereto, and outputs the loop count value LP that is incremented by one. Therefore, the loop counter 14 counts the number of the driving cycles from the starting up of the motor driving circuit 1a, i.e., the number of energized periods, and the loop count value LP indicates the number of energizations of the driving coil 9 from the starting up of the motor driving circuit 1a. The energized time period setting register 13 has the start-up count values T1 to T10 stored therein that each indicate an energized time period set in advance for each loop count value LP from 1 to 10.

The selecting circuit 15 outputs the start-up count values T1 to T10 respectively when the loop count values LP are one to 10, and outputs the normal-operation count value Ton when the loop count value LP is equal to or greater than 11. In practice, because the bit number of the loop counter 14 is limited, when the loop counter 14 counts to a value (e.g., 11) for the selecting circuit 15 to output the normal-operation count value Ton, for example, the loop counter 14 changes only the least significant bit (odd-even bit LP [0]) of the loop count value LP.

The timing control circuit 16 outputs the driving signals S1 and S2 based on the main count value CNT, and the output circuit 20 supplies the driving current to the driving coil 9 in response to the driving signals S1 and S2. Hereinafter, a driving current (first driving current) flowing through the driving coil 9 in the direction from the output terminal 91 to the output terminal 92 is referred to as "positive current", and a driving current (second driving current) flowing therethrough in the direction opposite to that of the positive current is referred to as "negative current".

More specifically, during a time period from the time when the main count value CNT is cleared by the edge detection signal EG to the time when it reaches an output value of the selecting circuit 15, the timing control circuit 16 sets one of the driving signals S1 and S2 high (at a high level). The output circuit 20 supplies, to the driving coil 9, the positive current (when the driving signal S1 is high) or the negative current (when the driving signal S2 is high).

Whereas, during a time period from the time when the main count value CNT reaches the output value of the selecting circuit 15 to the time when it is cleared by the edge detection signal EG, the timing control circuit 16 sets both of the driving signals S1 and S2 low (at a low level). The output circuit 20 supplies neither of the positive current and the negative current to the driving coil 9.

The timing control circuit 16 switches the driving signal, which is to be high during the energized period, in response to the odd-even bit LP [0]. Thus, the timing control circuit 16 switches between the positive current and the negative current to be supplied by the output circuit 20 to the driving coil 9, every time the odd-even bit LP [0] is changed by the edge detection signal EG.

As such, the timing control circuit 16 controls the energized period and the de-energized period, and the output circuit 20 supplies the positive current and the negative current to the driving coil 9 in an alternate manner with the de-energized period therebetween in accordance with the control of the timing control circuit 16. The NOR circuit 17 outputs the high impedance signal HZ which is high during the de-energized period during which the driving signals S1 and S2 both are low and the output of the output circuit 20 is in a high impedance state.

The induced voltage detecting circuit 30 amplifies a differential voltage V1–V2 of the voltages V1 and V2 and outputs the amplified voltage, thereby detecting an induced voltage generated across the driving coil 9 during the de-energized period. In this case, by satisfying the relationship of R1=R2 and R3=R4, the output voltage Vout of the induced voltage detecting circuit 30 results in $$Vout=Vref+(R3/R1)\cdot(V1-V2).$$

The comparator 40 compares the output voltage Vout with the reference voltage Vref, and outputs the comparison result signal CP, which goes high when the comparison result is Vout>Vref, that is, when the differential voltage V1–V2 is positive, and which goes low when it is negative.

The XOR circuit 52 of the edge detecting circuit 50 detects a rising edge and a falling edge of the comparison result signal CP by acquiring the exclusive-OR of the comparison result signal CP and a delay signal thereof (output signal of the delay circuit 51), and outputs the pulsed both-edge signal EGrf. Thus, the both-edge signal EGrf indicates the timing of a zero cross at which the sign of the differential voltage V1-V2 switches from positive to negative or form negative to positive.

The delay circuit 53 outputs the mask signal MS acquired by delaying the high impedance signal HZ, so as to mask the zero cross due to the driving current passed through the driving coil during the energized period (positive current or negative current) and/or by a regenerative current passed when the period is shifted from the energized period to the de-energized period. The AND circuit 54 masks the both-edge signal EGrf using the mask signal MS and outputs the edge detection signal EG.

As such, the zero-cross detecting circuit (the induced voltage detecting circuit 30, the comparator 40, and the edge detecting circuit 50) detects the zero cross of the induced voltage generated across the driving coil 9 during the de-energized period, and outputs the pulsed edge detection signal EG.

===Specific Example of Operation of Driving Circuit for Single-Phase Brushless Motor===

Figure 4:
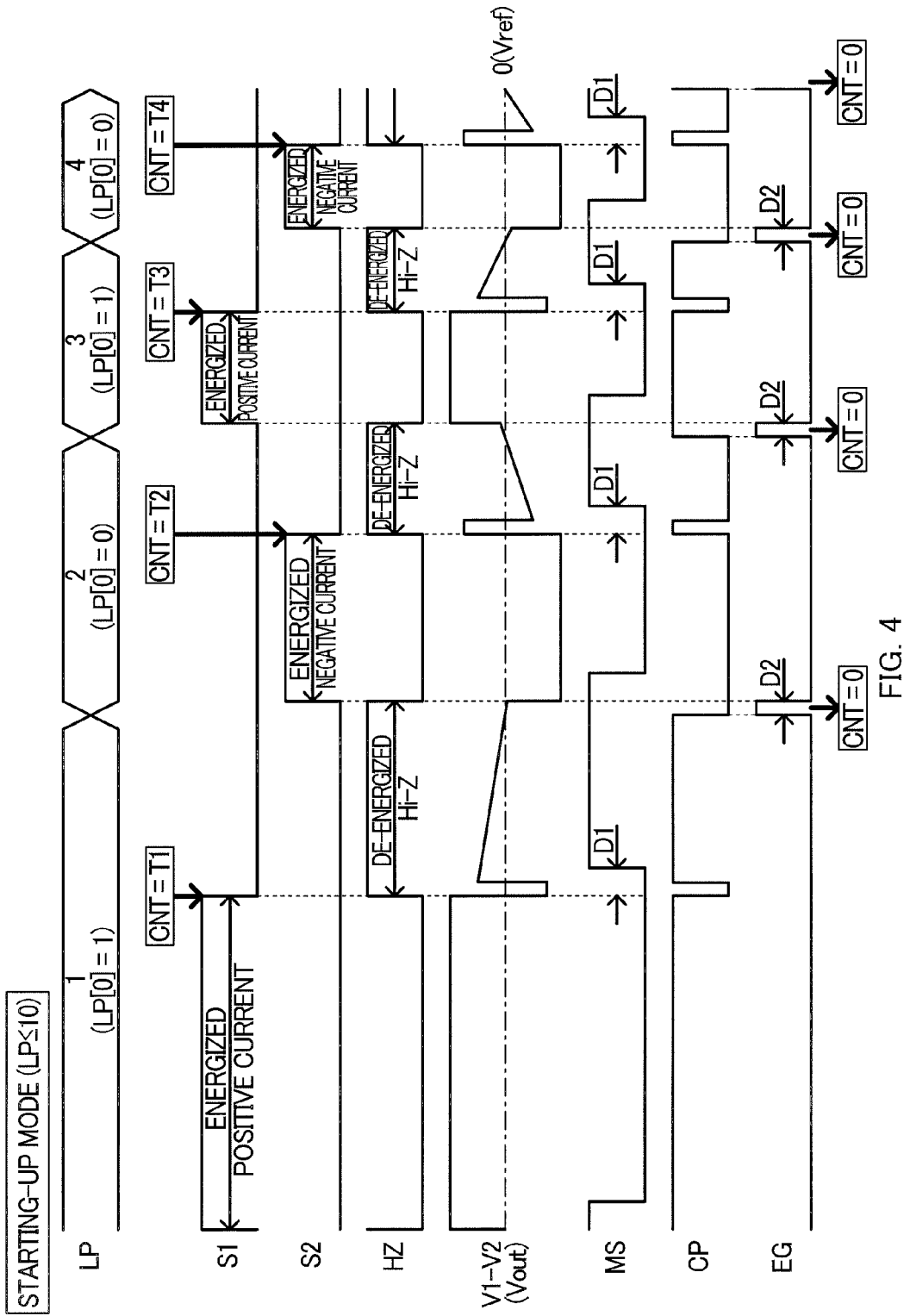
FIG. 4 is a diagram for explaining an operation of a motor driving circuit 1a in a starting-up mode according to a first embodiment of the present invention.
Figure 5:
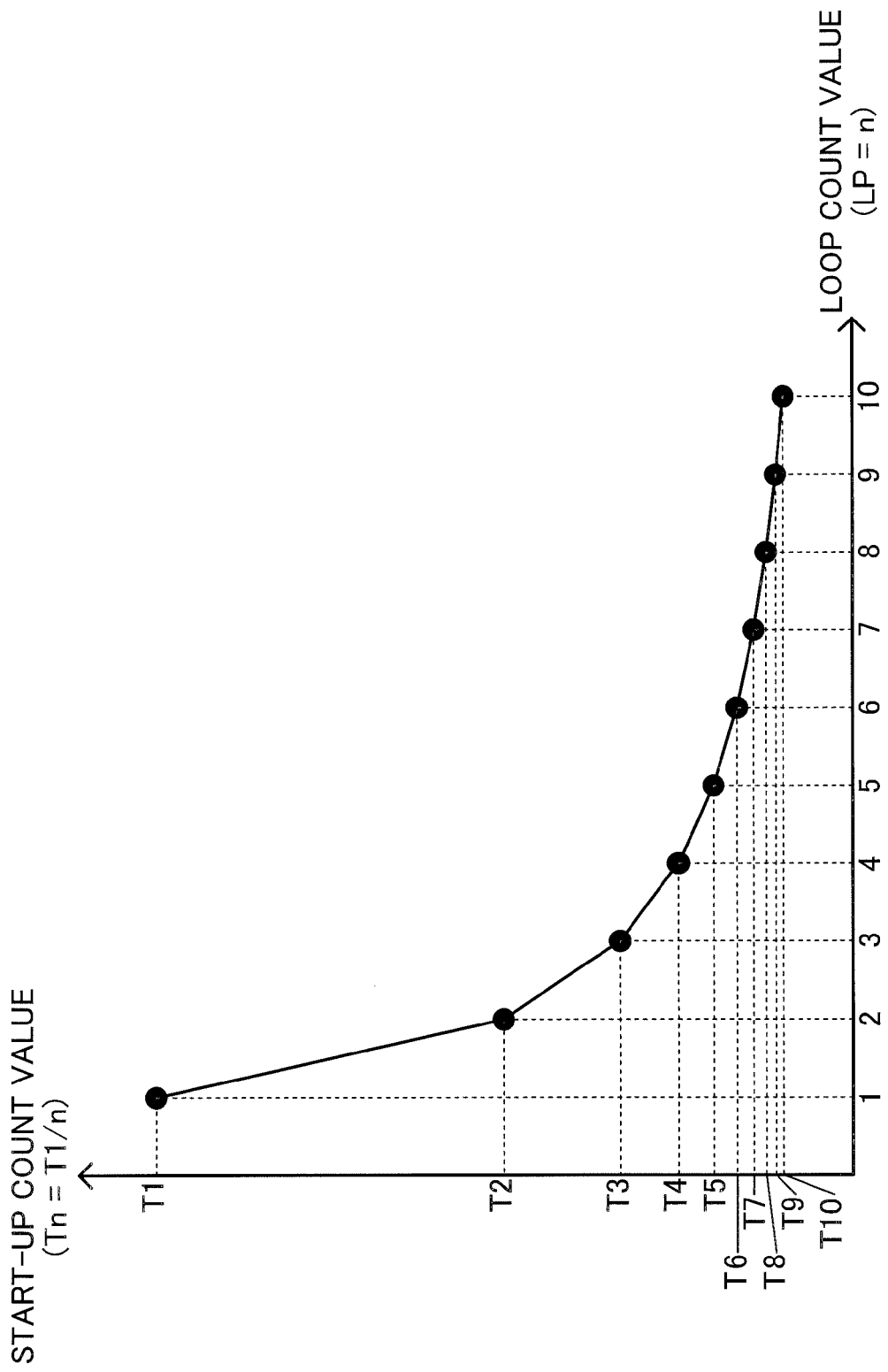
FIG. 5 is a diagram illustrating an example of a start-up count (energized time period) set in advance for each loop count value (the number of energizations) in a starting-up mode.
Figure 6:
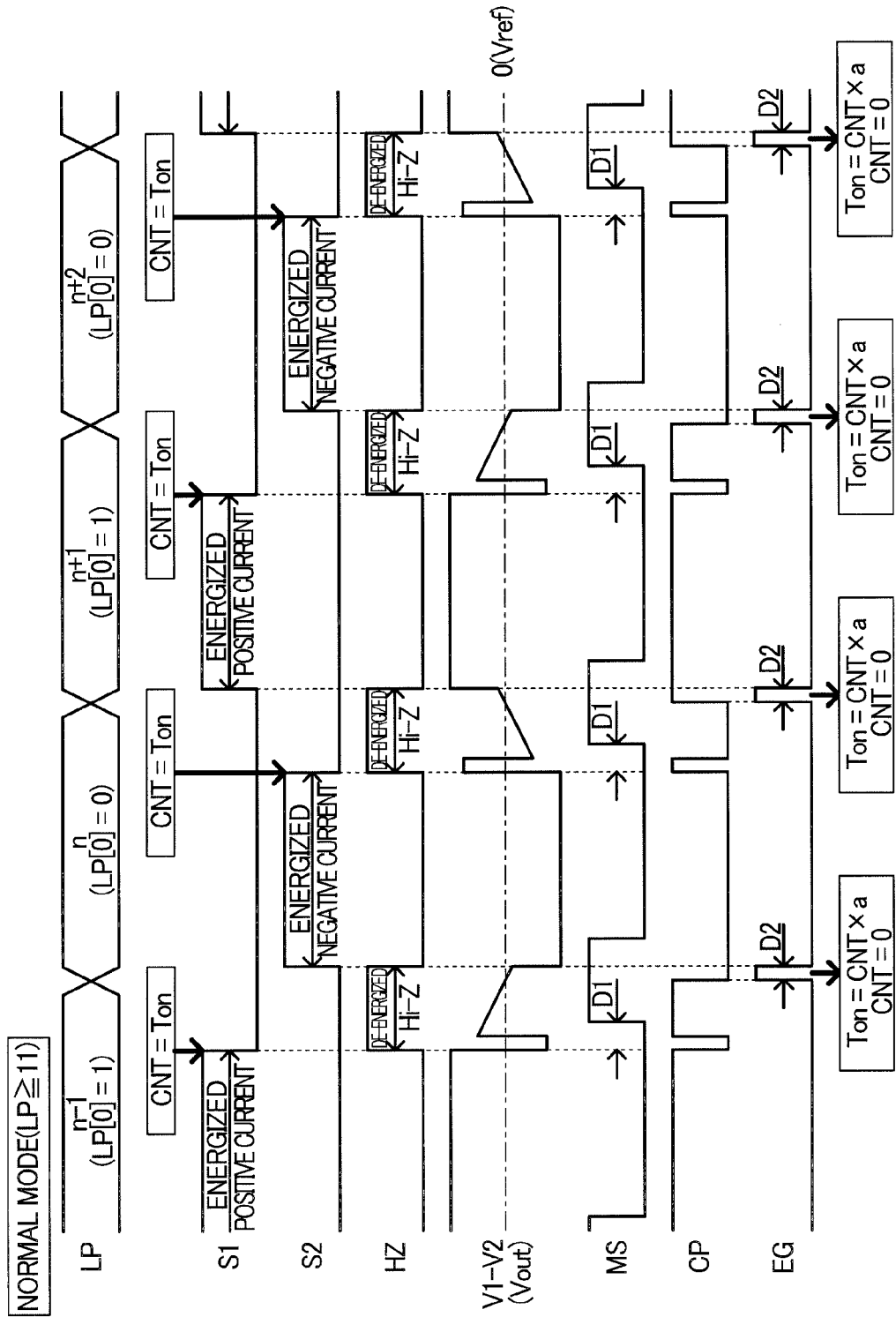
FIG. 6 is a diagram for explaining an operation of a motor driving circuit 1a in a normal mode according to a first embodiment of the present invention.

A specific example of an operation of the driving circuit for the singe-phase brushless motor according to an embodiment of the present invention will be described with reference to FIGS. 4 to 6 as appropriate. Hereinafter, an operation mode in which the loop count value LP is from 1 to 10 will be referred to as "starting-up mode", and an operation mode, which follows thereafter, will be referred to as "normal mode". A positive current flows through the driving coil 9 when the loop count value LP is an odd number (LP [0]=1), and a negative current flows through the driving coil 9 when the loop count value LP is an even number (LP [0]=0).

An operation of the motor driving circuit 1*a* in the starting-up mode (LP≤10) will be described with reference to FIG. 4. The starting-up mode indicates an operation mode from the start-up of the motor driving circuit 1*a* to the tenth driving cycle. FIG. 4 depicts the first to the fourth driving cycles.

When the motor driving circuit 1*a* is started up, the main counter 11 starts counting using the clock signal CLK, and the first driving cycle (LP=1) is started. The timing control circuit 16 sets the driving signal S1 high, and sets the driving signal S2 low, thereby starting the supply of the positive current from the output circuit 20 to the driving coil 9. During the energized period of the positive current, the differential voltage V1−V2 is positive, and the comparison result signal CP is high.

During the energized period of the positive current, when the main count value CNT reaches a start-up count value T1 (CNT=T1), the timing control circuit 16 sets both of the driving signals S1 and S2 low, thereby stopping the supply of both of the positive current and the negative current from the output circuit 20 to the driving coil 9. When the energized period shifts to the de-energized period, a zero cross occurs due to the regenerative current, however, the zero cross is masked by the mask signal MS acquired by delaying the high impedance signal HZ by a delay time period D1 of the delay circuit 53.

During the de-energized period, when the zero-cross detecting circuit detects the zero cross of the induced voltage generated across the driving coil 9 and outputs the edge detection signal EG having a pulse width of a delay time period D2 of the delay circuit 51, the main counter 11 is reset and the main count value CNT is cleared (CNT=0). Further, the loop count value LP is incremented and the second driving cycle (LP=2) is started. The timing control circuit 16 sets the driving signal S1 low and sets the driving signal S2 high, thereby starting the supply of the negative current from the output circuit 20 to the driving coil 9. During the energized period of the negative current, the differential voltage V1−V2 is negative and the comparison result signal CP is low.

During the energized period of the negative current, when the main count value CNT reaches a start-up count value T2 (CNT=T2), the timing control circuit 16 sets both of the driving signals S1 and S2 low, thereby stopping the supply of both of the positive current and the negative current from the output circuit 20 to the driving coil 9.

During the de-energized period, when the zero-cross detecting circuit detects the zero cross of the induced voltage and outputs the edge detection signal EG, the main counter 11 is reset and the main count value CNT is cleared (CNT=0). Further, the loop count value LP is incremented and the third driving cycle (LP=3) is started. The timing control circuit 16 sets the driving signal S1 high and sets the driving signal S2 low, thereby starting the supply of the positive current from the output circuit 20 to the driving coil 9 again.

As such, in the starting-up mode, the motor driving circuit 1*a* supplies the positive current or the negative current from the output circuit 20 to the driving coil 9 only during the energized time periods indicated by the start-up count values T1 to T10 respectively set in advance for loop count values LP, and the energized period shifts to the de-energized period. When the zero cross of the induced voltage generated across the driving coil 9 is detected during the de-energized period, the positive current and the negative current are switched, thereby shifting to the energized period. Then, these operations are repeated until the tenth driving cycle (LP=10).

Here, by setting (the energized time periods indicated by) the start-up count values T1 to T10 so as to decrease with increase in (the number of energizations indicated by) the loop count value LP, the motor driving circuit 1*a* are able to smoothly start up the single-phase brushless motor from a halting state to a high-speed rotation state. As depicted as an example in FIG. 5, the start-up count values T1 to T10 are set in advance to be substantially inversely proportional to the loop count value LP. Setting the start-up count values T1 to T10 as such enables the motor driving circuit 1*a* to further quickly start up the single-phase brushless motor.

Next, an operation of the motor driving circuit 1*a* in the normal mode (LP≥11) will be described with reference to FIG. 6. The normal mode indicates an operation mode in the eleventh driving cycle and thereafter, and FIG. 6 depicts (n−1)th to (n+2)th driving cycles ("n" is an even number equal to or greater than 12).

In the de-energized period in the (n−1)th driving cycle (LP=n−1), when the zero-cross detecting circuit detects the zero cross of the induced voltage and outputs the edge detection signal EG, the main counter 11 is reset and the main count value CNT is cleared (CNT=0). Further, the driving cycle storing register 12 stores therein the main count value CNT which is immediately before being cleared, as well as outputs the normal operation count value Ton acquired by multiplying the stored main count value CNT by the coefficient "a" (Ton=CNT×a). Here, the normal operation count value Ton indicates the length of the energized period in the n-th driving cycle (LP=n), and preferably, is set at about 70% of the whole (n−1)th driving cycle (a=0.7).

Further, the loop count value LP is incremented and the n-th driving cycle is started. Then, the timing control circuit 16 sets the driving signal S1 low and sets the driving signal S2 high, thereby starting the supply of the negative current from the output circuit 20 to the driving coil 9.

In the energized period in the n-th driving cycle, when the main count value CNT reaches the normal operation count value Ton (CNT=Ton), the timing control circuit 16 sets both of the driving signals S1 and S2 low, thereby stopping the supply of both of the positive current and the negative current from the output circuit 20 to the driving coil 9.

In the de-energized period, when the zero-cross detecting circuit detects the zero cross of the induced voltage and outputs the edge detection signal EG, the main counter 11 is reset and the main count value CNT is cleared (CNT=0). Further, the driving cycle storing register 12 stores therein the main count value CNT which is immediately before being cleared, as well as outputs the normal operation count value Ton (Ton=CN×a). Further, the loop count value LP is incremented and the (n+1)th driving cycle (LP=n+1) is started. The timing control circuit 16 sets the driving signal S1 high and sets the driving signal S2 low, thereby starting the supply of the positive current from the output circuit 20 to the driving coil 9.

As such, in the normal mode, the motor driving circuit 1*a* supplies the positive current or the negative current from the output circuit 20 to the driving coil 9 only during the energized time period indicated by the normal operation count value Ton which is acquired by multiplying the main count value CNT stored in the driving cycle storing register 12 by the predetermined coefficient "a" (0<a<1), and the period shifts to the de-energized period. In the normal mode started after the single-phase brushless motor is started up in the starting-up mode, since variations in the driving cycle are small, the length of the subsequent energized period is determined, at each time, to correspond to a predetermined proportion to the whole driving cycle immediately before the current cycle. Similarly to the starting-up mode, when the zero cross of the induced voltage generated across the driving coil 9 is detected during the de-energized period, between the positive current and the negative current are switched, thereby shifting to the energized period. These operations are repeated in each driving cycle.

Second Embodiment

===Configuration of Entire Driving Circuit and Edge Detecting Circuit of Single-Phase Brushless Motor===

As described above, the edge detecting circuit 50 according to a first embodiment of the present invention masks the both-edge signal EGrf with the mask signal MS which is acquired by delaying the high impedance signal HZ by the delay time period D1 of the delay circuit 53, and outputs the edge detection signal EG. Thus, the zero-cross detecting circuit starts the zero-cross detection after the delay time period D1 (predetermined time period) has elapsed from the start of the de-energized period, thereby masking the zero cross occurs due to the regenerative current that flows when the period is shifted from the energized period to the de-energized period.

Figure 7:
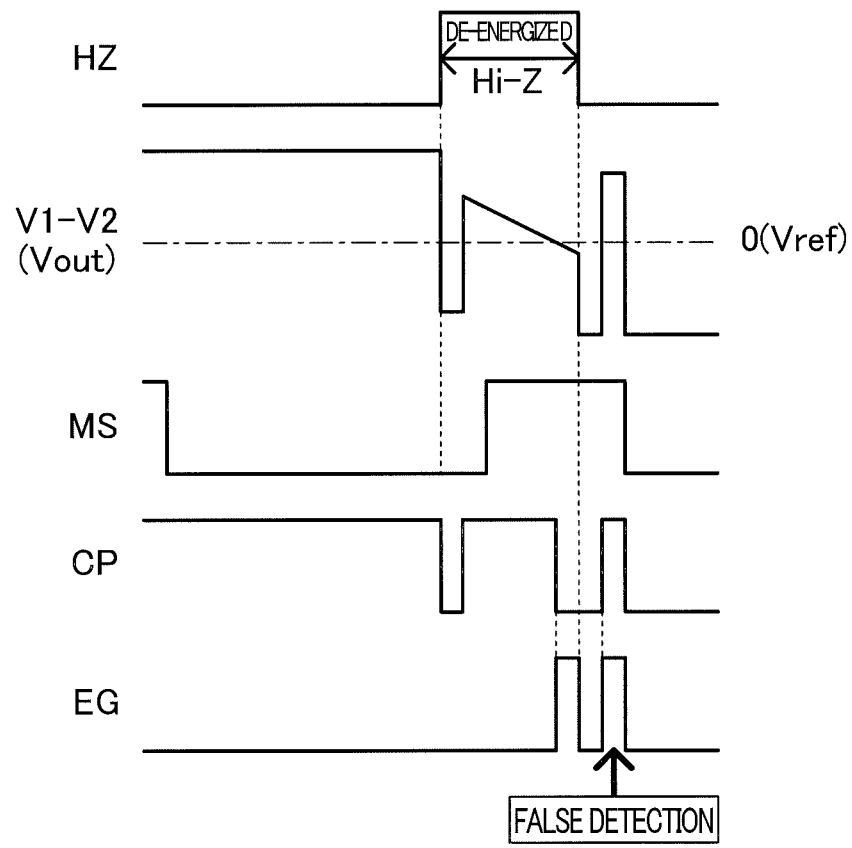
FIG. 7 is a diagram for explaining an operation of a motor driving circuit 1a executed when a zero cross occurs due to a driving current immediately after a zero cross of an induced voltage is detected according to a first embodiment of the present invention.

However, in the edge detecting circuit 50, the mask signal MS falls with a delay of the delay time period D1 relative to the start of the energized period. Thus, as depicted in FIG. 7, for example, immediately after the zero cross of the induced voltage is detected, the zero cross is detected due to the influence of the driving current that has started to be supplied to the driving coil 9, and the motor driving circuit 1a may malfunction due to such false detection.

As described above, the timing control circuit 16 switches between the positive current and the negative current supplied by the output circuit 20 to the driving coil 9, every time the odd-even bit LP [0] is changed in response to the edge detection signal EG.

Figure 8:
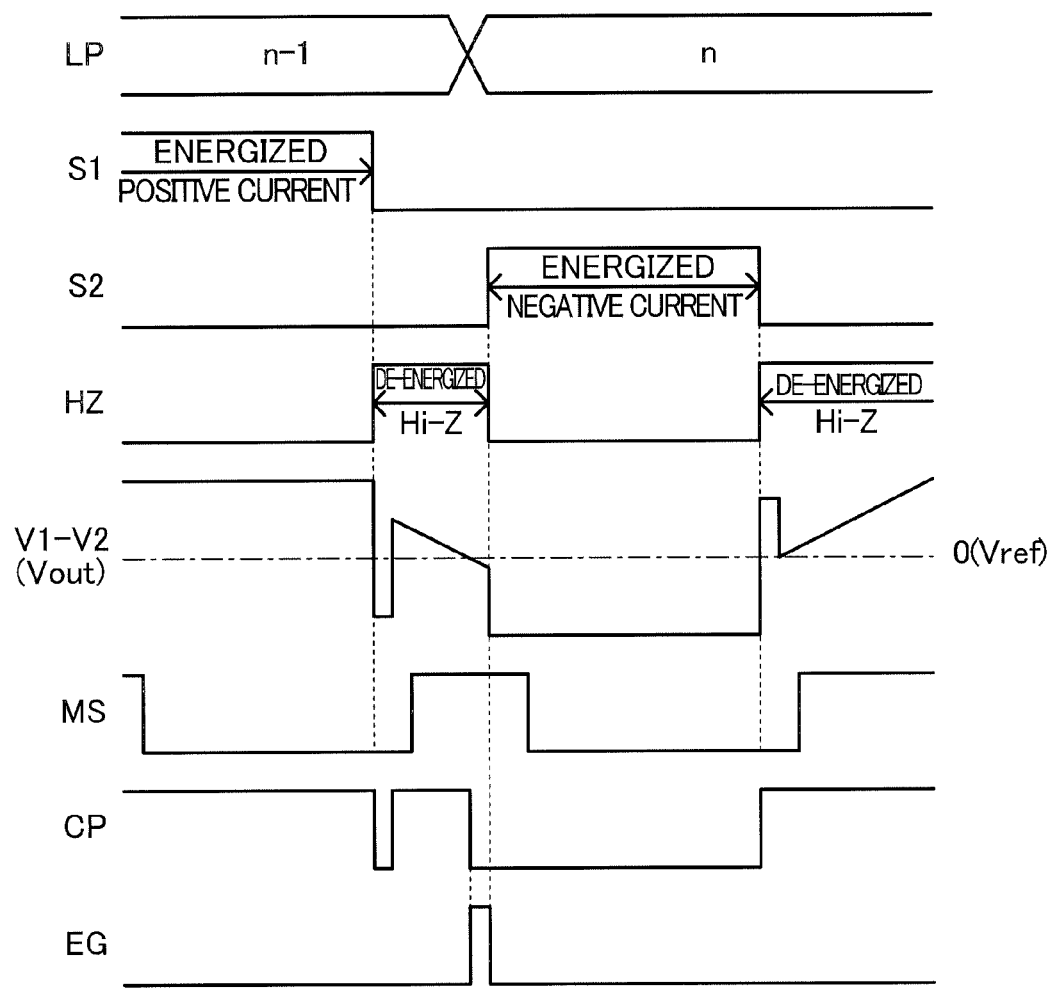
FIG. 8 is a diagram for explaining an operation of the motor driving circuit 1a executed when a zero cross occurs in an induced voltage during a non-detection period according to a first embodiment of the present invention.

However, when the zero cross occurs in the induced voltage before the mask signal MS starts up after the delay time period D1 has elapsed from the start of the de-energized period, this zero cross is masked with the mask signal MS. Further, during the energized period during which the driving current is supplied to the driving coil 9, or while the regenerative current flows when the period is shifted from the energized period to the de-energized period, in either case, the induced voltage generated across the driving coil 9 is unable to be detected accurately. Thus, as depicted in FIG. 8, for example, during the energized period, or when the zero cross occurs in the induced voltage before the mask signal MS rises during the de-energized period, the edge detecting circuit 50 does not output the pulsed edge detection signal EG, and thus the period cannot be shifted from the de-energized period to the energized period by switching between the positive current and the negative current.

Hereinafter, with reference to FIGS. 9 and 10, a description will be given of configurations, capable of preventing malfunction even in the above cases, of the entire driving circuit and the edge detecting circuit of a single-phase brushless motor according to a second embodiment of the present invention.

Figure 9:
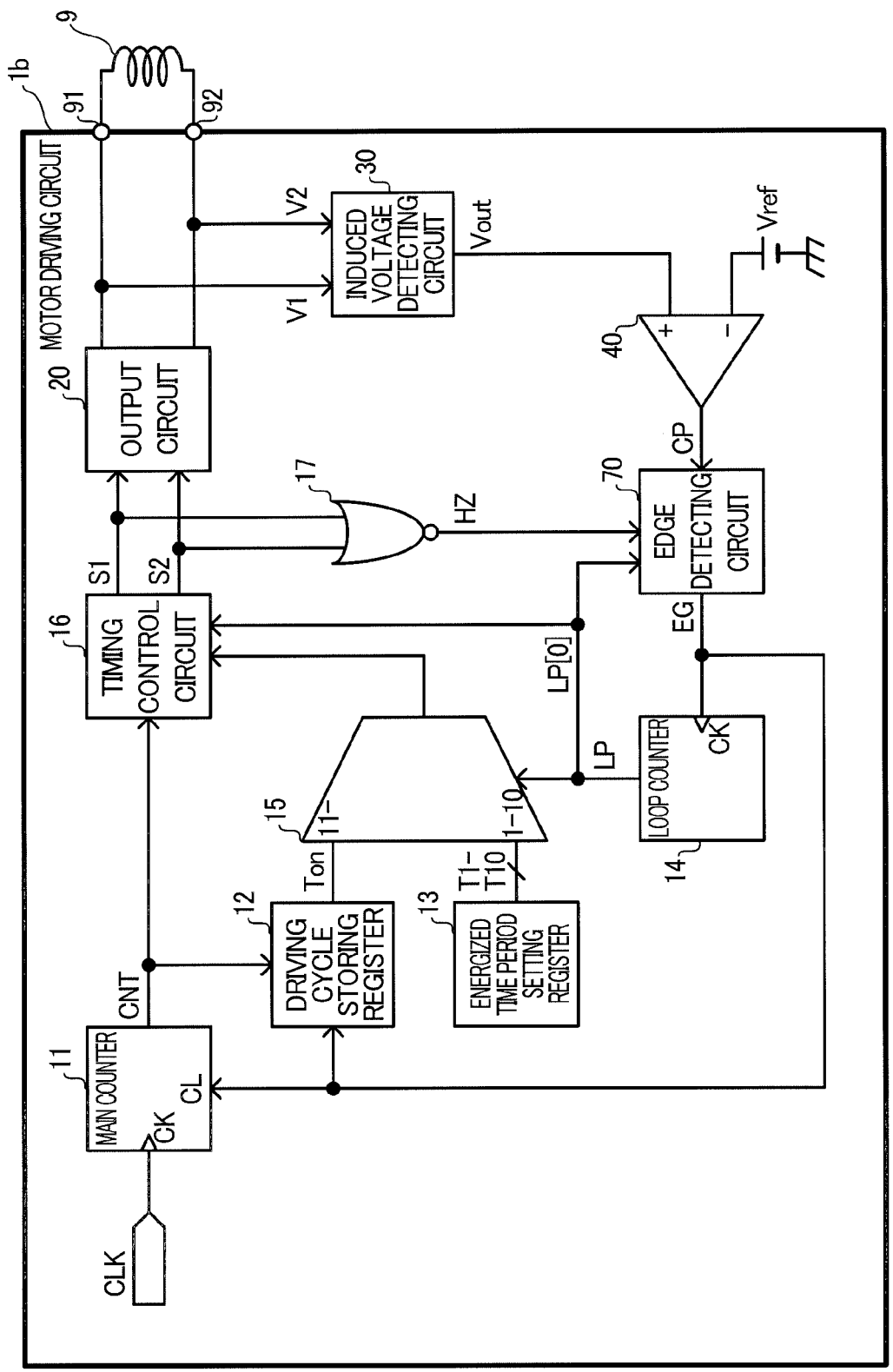
FIG. 9 is a circuit block diagram illustrating a configuration of the entire driving circuit for a single-phase brushless motor according to a second embodiment of the present invention.

A motor driving circuit 1b depicted in FIG. 9 includes an edge detecting circuit 70 in place of the edge detecting circuit 50 as compared to the motor driving circuit 1a according to a first embodiment of the present invention. The odd-even bit LP [0] outputted from the loop counter 14 is also inputted to the edge detecting circuit 70.

Figure 10:
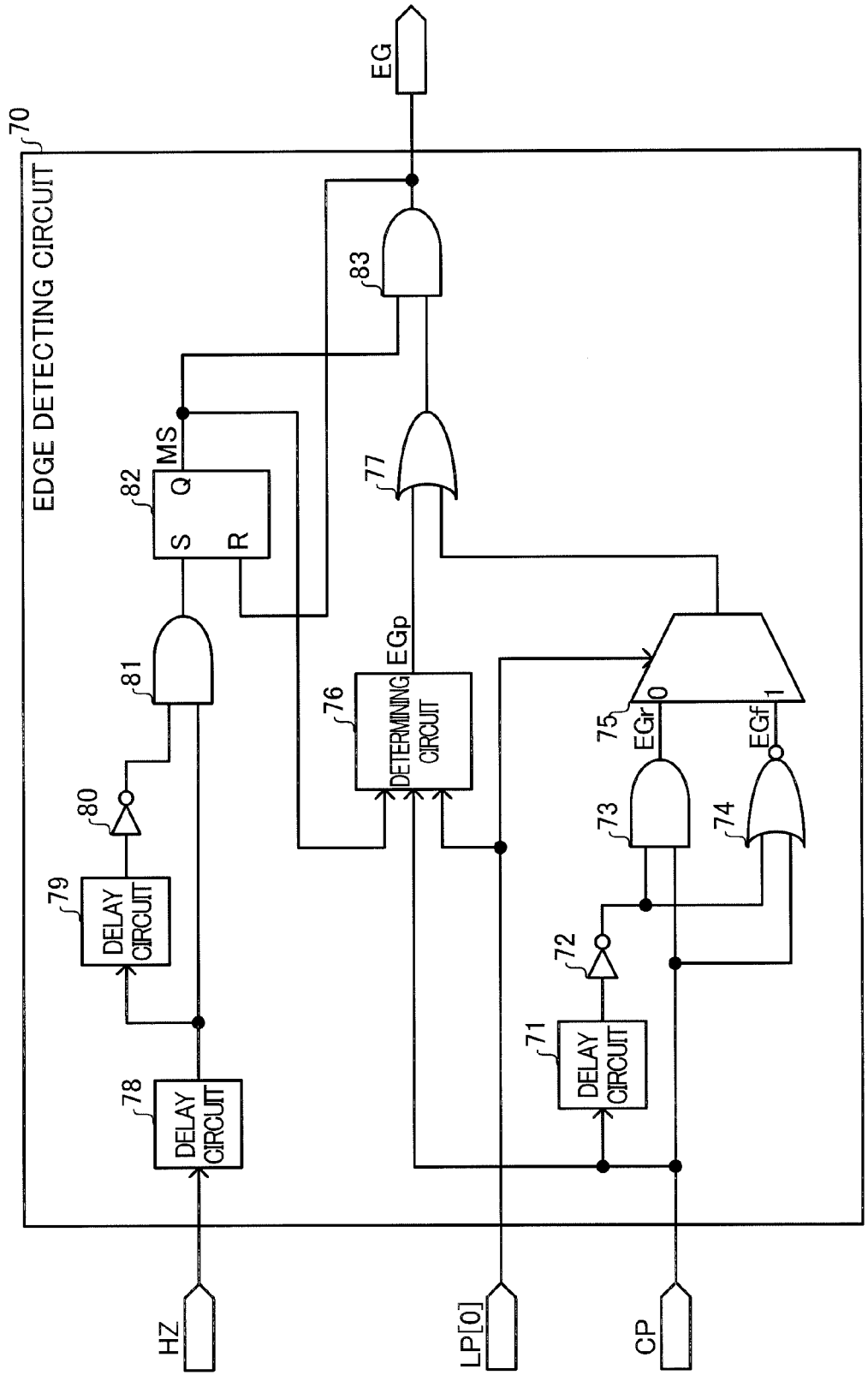
FIG. 10 is a circuit block diagram illustrating a configuration of an edge detecting circuit according to a second embodiment of the present invention.

The edge detecting circuit 70 depicted in FIG. 10 includes delay circuits 71, 78, and 79, inverters (inverting circuits) 72 and 80, AND circuits 73, 81, and 83, an NOR circuit 74, a selecting circuit 75, a determining circuit 76, an OR circuit (logical sum circuit) 77, and an RSFF (RS-flop flop) 82.

The comparison result signal CP is inputted to the delay circuit 71 and an output signal of the delay circuit 71 is inputted to the inverter 72. The comparison result signal CP and an output signal of the inverter 72 are inputted to the AND circuit 73, and a rising edge signal EGr is outputted from the AND circuit 73. Further, the comparison result signal CP and the output signal of the inverter 72 are also inputted to the NOR circuit 74, and a falling edge signal EGf is outputted from the NOR circuit 74.

The selecting circuit 75 is configured as a two-input, one-output multiplexer, and the odd-even bit LP [0] is inputted to a select control input thereof. The rising edge signal EGr is inputted to a data input thereof corresponding to the case where the odd-even bit LP [0] is zero, and the falling edge signal EGf is inputted to its data input corresponding to the case where the odd-even bit LP [0] is one.

The mask signal MS outputted from the RSFF 82, together with the comparison result signal CP and the odd-even bit LP [0], is inputted to the determining circuit 76, and a pseudo edge signal EGp is outputted from the determining circuit 76. An output signal of the selecting circuit 75 and the pseudo edge signal EGp are inputted to the OR circuit 77. An output signal of the OR circuit 77 and the mask signal MS are inputted to the AND circuit 83, and the edge detection signal EG is outputted from the AND circuit 83.

The high impedance signal HZ is inputted to the delay circuit 78. An output signal of the delay circuit 78 is inputted to the delay circuit 79, and an output signal of the delay circuit 79 is inputted to the inverter 80. Further, output signals of the delay circuit 78 and the inverter 80 are inputted to the AND circuit 81. An output signal of the AND circuit 81 is inputted to an "S" input (set input) of the RSFF 82, and the edge detection signal EG is inputted to an "R" input (reset input) thereof. The mask signal MS is outputted from the RSFF 82.

===Operation of Driving Circuit for Single-Phase Brushless Motor===

Figure 11:
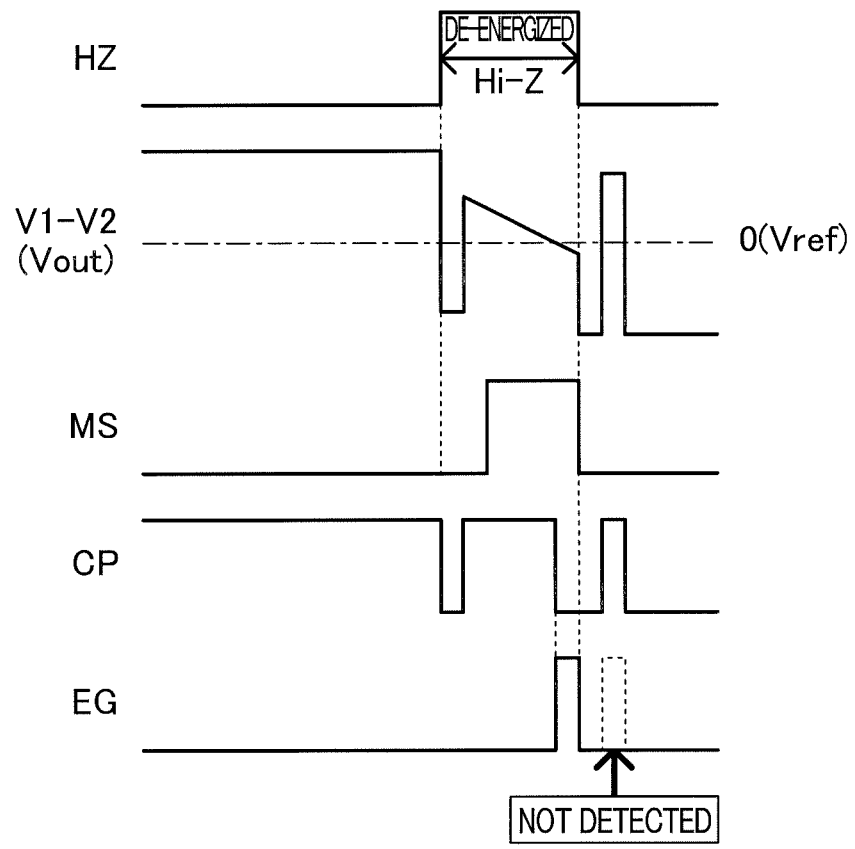
FIG. 11 is a diagram for explaining an operation of a motor driving circuit 1b executed when a zero cross occurs due to a driving current immediately after a zero cross of an induced voltage is detected according to a second embodiment of the present invention.
Figure 12:
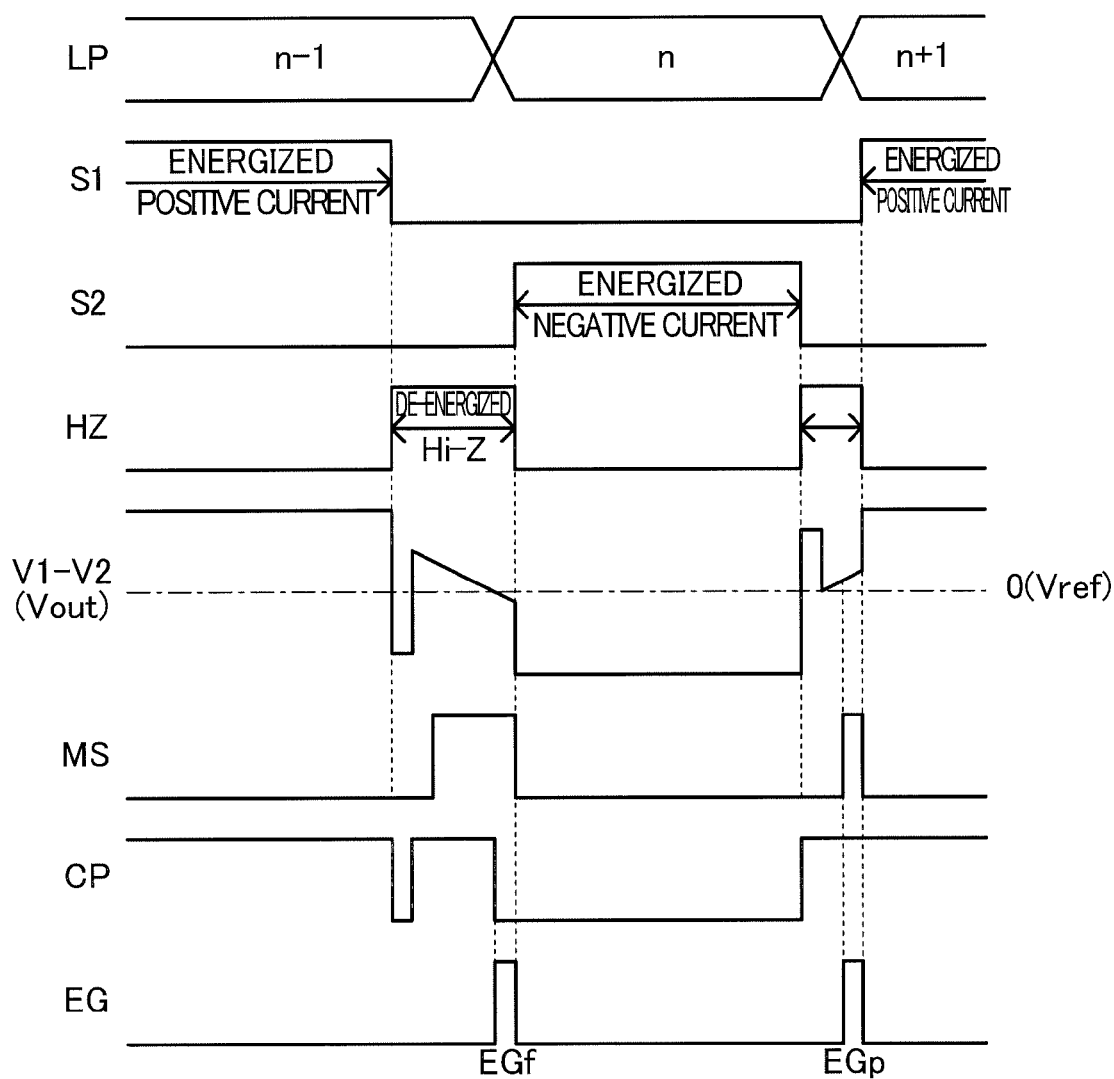
FIG. 12 is a diagram for explaining an operation of a motor driving circuit 1b executed when a zero cross occurs in an induced voltage during a non-detection period according to a second embodiment of the present invention.

An operation will hereinafter be described of the driving circuit for the single-phase brushless motor according to an embodiment of the present invention with reference to FIGS. 11 and 12 as appropriate. The operation of the motor driving circuit 1b according to an embodiment of the present invention is similar to the operation of the motor driving circuit 1a according to a first embodiment of the present invention except for an operation of the edge detecting circuit 70.

The AND circuit 73 of the edge detecting circuit 70 detects the rising edge of the comparison result signal CP by acquiring a logical product of the comparison result signal CP and its delayed inverted signal (output signal of the inverter 72), and outputs the pulsed rising edge signal EGr. Thus, the rising edge signal EGr indicates the timing of the zero cross at which the sign of the differential voltage V1−V2 changes from negative to positive.

Whereas, the NOR circuit 74 detects the falling edge of the comparison result signal CP by acquiring a negative logical sum of the comparison result signal CP and its delayed inverted signal, and outputs the pulsed falling edge signal EGf. Thus, the falling edge signal EGf indicates the timing of the zero cross at which the sign of the differential voltage V1–V2 changes from positive to negative.

The selecting circuit 75 outputs the falling edge signal EGf in each odd-numbered driving cycle (LP [0]=1) in which the positive current is supplied to the driving coil 9. On the other hand, the selecting circuit 75 outputs the rising edge signal EGr in each even-numbered driving cycle (LP [0]=0) in which the negative current is supplied to the driving coil 9.

The AND circuit 81 detects the rising edge of the output signal of the delay circuit 78 by acquiring a logic product of the output signal of the delay circuit 78 and its delayed inverted signal (output signal of the inverter 80). Thus, the mask signal MS outputted from the RSFF 82 goes high after the delay time period D1 of the delay circuit 78 has elapsed from the start of the de-energized period (the rising edge of the high impedance signal HZ). When the pulsed edge detection signal EG is outputted from the AND circuit 83, the period is shifted from the de-energized period to the energized period and the mask signal MS goes low.

As such, in the motor driving circuit 1b according to an embodiment of the present invention, the mask signal MS is low from the start of the energized period to the time when the delay time period D1 (predetermined time period) has elapsed from the start of the de-energized period. The zero-cross detecting circuit starts the zero-cross detection after the delay time period D1 has elapsed from the start of the de-energized period, and when the zero cross is detected, the zero-cross detecting circuit ends the zero-cross detection. Thus, as depicted in FIG. 11, for example, when the zero cross of the induced voltage is detected and the pulsed edge detection signal EG is outputted, the mask signal MS goes low. Therefore, even when a zero cross occurs due to the driving current immediately thereafter, the zero cross is not detected. In the following, the time period during which the mask signal MS is low is referred to as "non-detection period".

The determining circuit 76 determines whether the zero cross occurs in the induced voltage during the non-detection period, based on the logic level of the comparison result signal CP at the start of the zero-cross detection (the rising edge of the mask signal MS).

More specifically, during an odd-numbered driving cycle (LP [0]=1) during which the zero cross from positive to negative is detected and the falling edge signal EGf is to be outputted, when the comparison result signal CP is low at the start of the zero-cross detection, it is determined that the zero cross occurs in the induced voltage during the non-detection period. On the other hand, during an even-numbered driving cycle (LP [0]=0) during which the zero cross from negative to positive is detected and the rising edge signal EGr is to be outputted, when the comparison result signal CP is high at the start of the zero-cross detection, it is determined that the zero cross occurs in the induced voltage during the non-detection period. When it is determined that the zero cross occurs in the induced voltage during the non-detection period, the determining circuit 76 outputs the pulsed pseudo edge signal EGp at the start of the zero-cross detection.

As such, the motor driving circuit 1b according to an embodiment of the present invention outputs the pseudo edge signal EGp indicative of the determination result that zero cross occurs in the induced voltage during the non-detection period, in addition to the rising edge signal EGr and the falling edge signal EGf indicative of the timing of the zero cross. The zero-cross detecting circuit outputs the edge detection signal EG when detecting the zero cross of the induced voltage during the de-energized period, and in addition thereto, also outputs the edge detection signal EG at the start of the zero-cross detection when the zero-cross detecting circuit determines that the zero cross occurs in the induced voltage during the non-detection period. Therefore, as depicted in FIG. 12, for example, the pulsed edge detection signal EG is outputted also when the zero cross occurs in the induced voltage during the non-detection period, and thus the period can be shifted to the energized period by switching between the positive current and the negative current.

As described above, in the motor driving circuits 1a and 1b, while the positive current and the negative current are being supplied to the driving coil 9 in an alternate manner with the de-energized period therebetween, in the normal mode after the starting up of the single-phase brushless motor, the length of the subsequent energized period is determined at each time based on the driving cycle including the energized period for energizing the driving coil 9 and the subsequent de-energized period, thereby being able to drive the single-phase brushless motor without using any position detecting element such as a Hall element. Thus, miniaturization of the motor is enabled: by reducing the height of the motor by further reducing the thickness of the chip of the motor driving IC; and/or by mounting the IC on the exterior of the motor. Even when the IC is mounted on the interior of the motor, the variation in the position for the IC to be mounted does not effect on the precision in detecting the rotation position of the rotor, and the cost of the motor may be reduced by simplifying the manufacture process of the motor, as well as reduction in cost of the IC can be reduced by reducing the testing man-hours before shipment.

The detection of the zero cross is started after the delay time period D1 (predetermined time period) has elapsed from the start of the de-energized period, thereby being able to mask the zero cross due to the regenerative current flowing when the period is shifted from the energized period to the de-energized period.

Further, in the motor driving circuit 1b, when the zero cross is detected, the zero cross can be masked by ending the zero-cross detection, even when the zero cross due to the driving current occurs immediately after the zero cross of the induced voltage is detected.

Further, in the motor driving circuit 1b, in addition to the case where the zero cross of the induced voltage is detected during the de-energized period, in the case where it is determined that the zero cross occurs in the induced voltage during the non-detection period, the pulsed edge detection signal EG is outputted, thereby switching between the positive current and the negative current and the period is shifted from the de-energized period to the energized period.

Further, in the motor driving circuits 1a and 1b, the mask signal MS is generated which goes high after the delay time period D1 has elapsed from the start of the de-energized period, thereby being able to mask, with the mask signal MS, the zero cross which occurs due to the regenerative current flowing when the period is shifted from the energized period to the de-energized period.

Further, in the motor driving circuit 1b, the mask signal MS is generated which goes low from the start of the energized period to the time when the delay time period D1 has elapsed from the start of the de-energized period, thereby being able to mask the zero cross with the mask signal MS even when the zero cross due to the driving current occurs immediately after the zero cross of the induced voltage is detected.

Further, the motor driving circuit 1b generates the pseudo edge signal EGp indicative of the determination result that the zero cross occurs in the induced voltage during the non-detection period based on the logic level of the comparison result signal CP at the start of the zero-cross detection, thereby being able to output the pulsed edge detection signal EG even when the zero cross occurs in the induced voltage during the non-detection period, and switch between the positive current and the negative current and the period is shifted to the energized period.

In embodiments described above, the operation mode in a period when the loop count values LP is one to 10 is given as the starting-up mode. However, the number "m" of loop count values LP to set the starting-up mode may be varied as appropriate. In this case, the number m of start-up count values T1 to Tm are set in advance respectively for the loop count values LP one to m, and are stored in the energized period setting register 13.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A driving circuit for a single-phase brushless motor, comprising:
   a driving signal generating circuit configured to generate a driving signal for supplying, to a driving coil of the single-phase brushless motor, a first driving current and a second driving current opposite in direction to the first driving current, in an alternate manner with a de-energized period therebetween during which neither of the first driving current or the second driving current is supplied to the driving coil;
   an output circuit configured to supply the first or the second driving current to the driving coil in response to the driving signal; and
   a zero-cross detecting circuit configured to detect a zero cross of an induced voltage, generated across the driving coil, during the de-energized period,
   the driving signal generating circuit further configured to determine a length of a subsequent energized period, based on a driving cycle from a start of an energized period, during which the output circuit supplies the first or the second driving current to the driving coil, to a time when the zero-cross detecting circuit detects the zero cross,
   the zero-cross detecting circuit further configured to start detection of the zero cross after a predetermined time period has elapsed from a start of the de-energized period.

2. The driving circuit for a single-phase brushless motor of claim 1, wherein
   the zero-cross detecting circuit is configured to start detection of the zero cross after the predetermined time period has elapsed from the start of the de-energized period, and end the detection of the zero cross when the zero cross is detected.

3. The driving circuit for a single-phase brushless motor of claim 1, wherein
   the zero-cross detecting circuit is configured to determine whether or not the zero cross occurs in the induced voltage during a non-detection period from the start of the energized period to the start of the detection of the zero cross, and wherein
   the driving signal generating circuit is configured to switch between the first driving current and the second driving current and cause the first or the second driving current to start to be supplied from the output circuit to the driving coil, when the zero-cross detecting circuit detects the zero cross and when the zero-cross detecting circuit has determined that the zero cross occurs in the induced voltage during the non-detection period.

4. The driving circuit for a single-phase brushless motor of claim 2, wherein
   the zero-cross detecting circuit is configured to determine whether or not the zero cross occurs in the induced voltage during a non-detection period from the start of the energized period to the start of the detection of the zero cross, and wherein
   the driving signal generating circuit is configured to switch between the first driving current and the second driving current and cause the first or the second driving current to start to be supplied from the output circuit to the driving coil, when the zero-cross detecting circuit detects the zero cross and when the zero-cross detecting circuit has determined that the zero cross occurs in the induced voltage during the non-detection period.

5. The driving circuit for a single-phase brushless motor of claim 1, wherein
   the zero-cross detecting circuit includes:
   a differential amplifier circuit configured to differentially amplify a voltage across the driving coil;
   a comparator configured to compare an output voltage of the differential amplifier circuit and a predetermined reference voltage; and
   an edge detecting circuit configured to detect a rising edge or a falling edge of an output signal of the comparator, and output an edge detection signal, wherein
   the edge detecting circuit is configured to generate a mask signal for performing masking for the predetermined time period elapsed from the start of the de-energized period, and mask the edge detection signal with the mask signal, to be outputted therefrom, and wherein
   the driving signal generating circuit is configured to switch between the first driving current and the second driving current every time the edge detection signal is inputted thereto from the edge detecting circuit, and cause the first or the second driving current to start to be supplied from the output circuit to the driving coil.

6. The driving circuit for a single-phase brushless motor of claim 5, wherein
   the edge detecting circuit is configured to generate the mask signal for performing masking during a time period from the start of the energized period to a time when the predetermined time period has elapsed from the start of the de-energized period, and mask the edge detecting signal with the mask signal, to be outputted therefrom.

7. The driving circuit for a single-phase brushless motor of claim 5, wherein
   the edge detecting circuit is configured to determine whether or not the zero cross occurs in the induced voltage during a non-detection period, during which the edge detection signal is masked with the mask signal, based on an output signal of the comparator, and when it is determined that the zero cross occurs in the induced voltage during the non-detection period, output the edge detection signal after the predetermined time period has elapsed from the start of the de-energized period.

8. The driving circuit for a single-phase brushless motor of claim 6, wherein the edge detecting circuit is configured to determine whether or not the zero cross occurs in the induced voltage during a non-detection period, during which the edge detection signal is masked with the mask signal, based on an output signal of the comparator, and when it is determined that the zero cross occurs in the induced voltage during the non-detection period, output the edge detection signal after the predetermined time period has elapsed from the start of the de-energized period.

* * * * *